United States Patent [19]

Angwin

[11] 4,012,736
[45] Mar. 15, 1977

[54] RADAR SPEEDOMETER

[75] Inventor: James H. Angwin, Merrimack, N.H.

[73] Assignee: Merlin A. Pierson, Newton, Mass.

[22] Filed: Dec. 11, 1974

[21] Appl. No.: 531,807

[52] U.S. Cl. .............................. 343/8; 343/7 VM; 328/111; 328/120
[51] Int. Cl.² ......................................... G01S 9/44
[58] Field of Search .............. 343/7 A, 7 VM, 8, 9; 328/111, 120

[56] References Cited

UNITED STATES PATENTS

| | | | |
|---|---|---|---|
| 3,153,762 | 10/1964 | Johnson | 328/120 |
| 3,213,375 | 10/1965 | John | 328/120 |
| 3,624,410 | 11/1971 | Bruckert | 328/111 |
| 3,727,142 | 4/1973 | De Sipio et al. | 328/111 |
| 3,833,906 | 9/1974 | Augustine | 343/8 |
| 3,895,384 | 7/1975 | Fathauer et al. | 343/9 |

*Primary Examiner*—Malcolm F. Hubler
*Assistant Examiner*—S. C. Buczinski
*Attorney, Agent, or Firm*—Robert F. O'Connell

[57] ABSTRACT

The speedometer is for use on a vehicle such as an automobile or train for providing a continuously updated digital reading of vehicle speed and a cumulative digital reading of total mileage traveled. By means of a front end transmitter-receiver antenna arrangement, a signal is provided, the frequency of which corresponds to velocity of the vehicle. This signal is coupled to a novel duty cycle detector which essentially rejects spurious noise signals and passes only signals of a predetermined duty cycle. A true signal is passed to a signal stabilization circuit which is responsive to the frequency of the signal for essentially replacing lost signal pulses. The pulse signal which is representative of vehicle speed is then coupled to both the odometer counter for ultimately providing a reading of mileage traveled and to the speedometer counter for ultimately providing a reading of vehicle speed.

14 Claims, 6 Drawing Figures

RADAR SPEEDOMETER

BACKGROUND OF THE INVENTION

The present invention relates to a radar speedometer which is for use on a moving vehicle such as an automobile or railroad train. The speedometer provides both a continuously updated preferably digital reading of vehicle speed and an odometer reading of accumulative mileage.

The prior art discloses radar speedometers for displaying vehicle speed. However, these prior art devices are characterized by certain problems. For example, some of these devices are rather complex and expensive to fabricate. Another problem that is inherent in prior art systems, is brought about by the presence of spurious noise signals which many times cause false counts.

In a prior art system such as the one shown in U.S. Pat. No. 3,833,906 the antenna is typically maintained at a 45° angle relative to the ground. If this angle changes for any reason during use of the device, the output reading is improper, being either higher or lower than the proper reading.

It is also known in the prior art that signal pulses are many times lost and although attempts have been made to provide for replacement of these lost pulses, the techniques employed have not been completely successful.

Accordingly, one object of the present invention is to provide an improved radar speedometer for use on land vehicles.

Another object of the present invention is to provide a radar speedometer that is not unduly complex in construction and that can be easily installed in any existing vehicle.

A further object of the present invention is to provide novel noise rejection means for preventing false counts due to noise signals.

Still another object of the present invention is to provide a signal stabilization means which is responsive to the frequency of the incoming signal for essentially replacing lost signal pulses.

Another object of the present invention is to provide for calibrating both the speedometer and odometer output readings as a function of antenna angle.

SUMMARY OF THE INVENTION

To accomplish the foregoing and other objects of this invention, there is provided a radar speedometer for a vehicle such as an automobile or a train. The system generally comprises a conventional input detection circuit which may comprise a Gunn diode oscillator and a crystal detector for providing a cyclic signal, the frequency of which relates to the velocity at which the vehicle is traveling. In accordance with one feature of the present invention, means are provided for receiving the cyclic signal and for detecting the duty cycle of the signal. This duty cycle detector in the disclosed embodiment comprises a pair of comparators which pass only signals of a predetermined range of duty cycle about a 50% duty cycle. Generally, spurious noise signals have a duty cycle closer to either 0 or 100% duty cycle rather than the 50% duty cycle. Thus, the detector essentially filters out spurious noise signals.

In accordance with another feature of the present invention, the signals that are passed by the duty cycle detector are coupled to a signal stabilization circuit which comprises a voltage controlled oscillator that is controlled in accordance with the frequency of the input signal. The input to the voltage control oscillator is synchronized by the input signal but if a pulse is lost the oscillator essentially replaces the missing pulse.

After processing through the signal stabilization circuitry, the signal is coupled to both the odometer output circuitry and the speedometer output circuitry. The odometer circuitry comprises a counter and a circuit for both resetting the counter and providing an incrementing of the odometer reading which is represented by a digital display.

The signal that couples to the speedometer circuitry couples to a pair of binary counters that store the pulses and display the stored reading at predetermined time intervals. A main clock sets the predetermined time interval and the speedometer reading is updated in accordance with the frequency of operation of this main clock.

DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
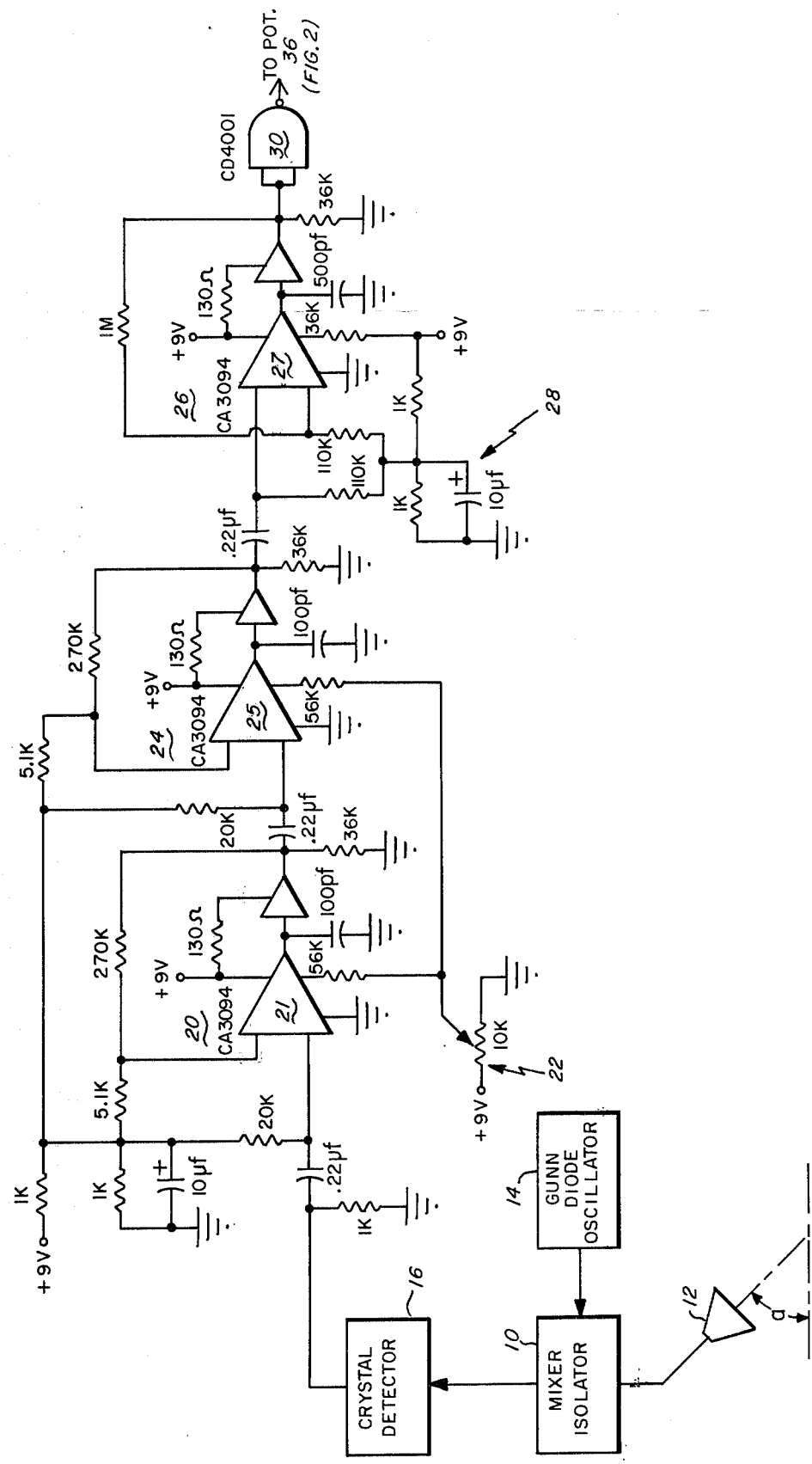
FIG. 1 is a circuit block diagram of the front end of the system of this invention including the circuitry for generating a cyclic signal corresponding to velocity of the vehicle.

FIG. 1 shows the circuitry for the front end of the speedometer system of this invention. The microwave portion of this circuitry includes a mixer-isolater 10, antenna 12, a Gunn diode oscillator 14, and a crystal detector 16. In this system the antenna 12 is preferably directed at an angle a of 45° with respect to the ground surface. The system shown in FIGS. 1-5 is designed primarily for use in a railroad train but, of course, could be readily adapted for use in a motor vehicle. The deviation of the angle a is discussed in more detail hereinafter with reference to certain calibration techniques.

Figure 6:
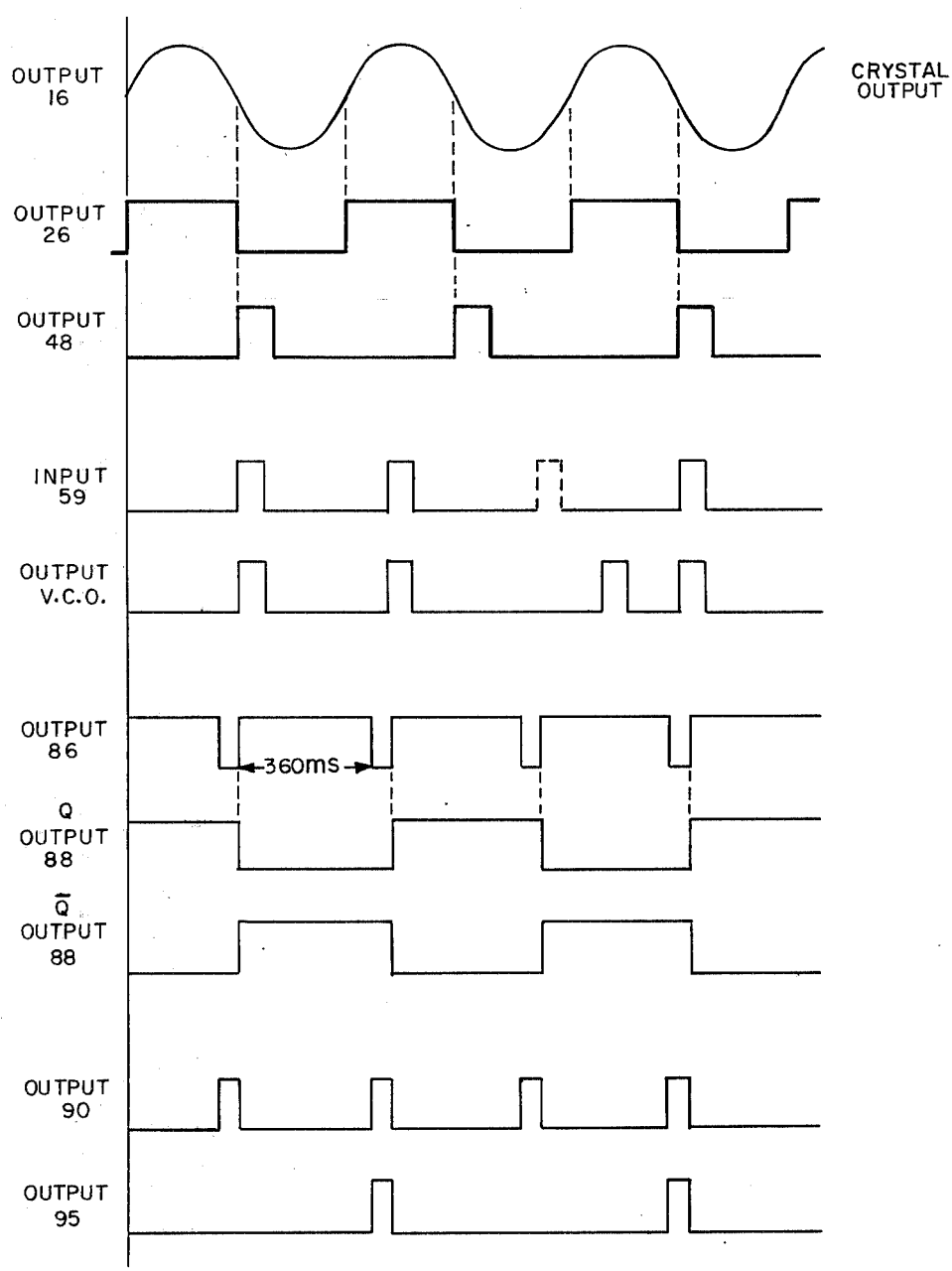
FIG. 6 shows various waveforms associated with the circuitry shown in FIGS. 1-5.

As already mentioned, the arrangement of the microwave portion of the circuitry is essentially conventional. The Gunn diode oscillator 14 may comprise a Gunn diode and a regulated power supply for biasing the Gunn diode at a frequency on the order of 10 Gigahertz. Most of the energy from the oscillator 14 is coupled to the antenna 12. The energy is also received by the antenna 12 and is mixed in the mixer-isolater 10. The crystal detector 16 detects the mixed signal and may be a conventional square law detector. It is known that all components of the detector output are high frequency of the RF type except for one component. This single component is the relatively low frequency signal which is the difference between the transmitted frequency and the received frequency. This signal is sometimes referred to as the doppler frequency signal and is the signal that is coupled from the crystal detector 16 to amplifier 20, shown in FIG. 1. This signal is shown in FIG. 6 as a sinusoidal waveform of a frequency corresponding to the motion of the vehicle.

In FIGS. 1–5 many of the individual components shown are conventional, per se. For example, in FIG. 1, the amplifier device 21 is a conventional amplifier sold by RCA and identified as their device CA3094. For a more thorough description of many of these individuals electronic devices, reference is hereihn made to *Solid State Databook Series*, 1973 Edition published by RCA. Moreover, many of the components associated with some of these devices such as the resistors associated with device 21 are arranged in a conventional manner suggested by the manufacturer as set forth in handbooks such as the one referred to herein. Thus, in order to clearly set forth the invention, the description of the interconnection of all of these various components is not deemed necessary. For example, the amplifier 20 can be considered of conventional design and simply provides for an amplification of signal from the output of detector 16.

The output from amplifier 20 couples to a further amplifier 24 which also includes an amplification device 25. Amplifiers 20 and 24 are substantially identical and each have an input coupling from the gain adjust potentiometer 22. The gain adjustment is desirable as different gain settings are preferred depending upon the placement of the speedometer. For example, the gain should be set at a higher level, the greater the distance between the antenna and the ground surface.

The amplified sinusoidal signal from amplifier 24 couples to a Schmitt trigger circuit 26 which also includes device 27. The trigger circuit 26 is not provided for the purpose of amplifying the signal from amplifier 24 but is provided to convert the sinusoidal signal to a squared signal as shown in FIG. 6. In order to provide this type of operation the trigger circuit 26 comprises a voltage divider 28. The output from the trigger circuit 26 couples to an inverter gate 30 for inverting the signal shown in FIG. 6 and for assuring that signal swings from 0 to 9 volts in this case.

Figure 2:
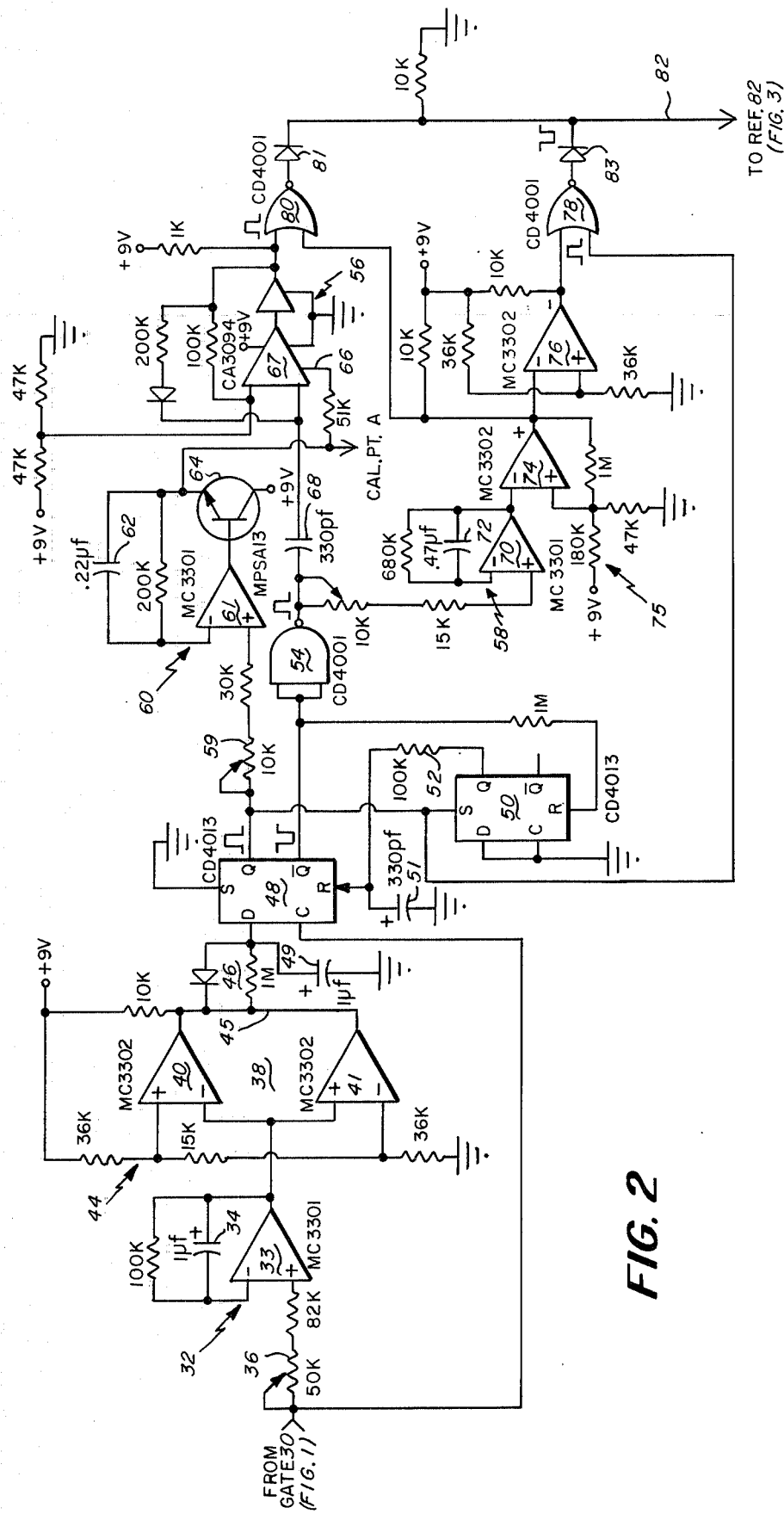
FIG. 2 shows additional circuitry of processing the cyclic signal including the duty cycle detector and signal stabilization circuit.

The output from inverter 30 couples to the circuitry shown in FIG. 2 including an integrator 32 which comprises device 33 which is a conventional Motorola device identified as device MC3301. The integrator 32 also comprises an integrating capacitor 34. The output of the integrator 33 is a level that is typically between 0 and 9 volts and is a function of the input duty cycle which ideally, as shown in FIG. 6, has a 50% duty cycle. If this is truly a 50% duty cycle then the voltage at the output of integrator 33 is ½ of 9 volts or 4.5 volts. A potentiometer 36 is also included for calibration purposes and to assure that with a 50% duty cycle signal, the output of the integrator 33 is at the desired voltage.

The output from the integrator 32 couples to the duty cycle detector 38 which comprises a pair of comparators 40 and 41. Each of these comparators are conventional Motorola devices identified as devices MC3302. The comparator 40 has its positive input coupled to divider 44 and comparator 41 has its negative input also coupled to divider 44 for biasing the two comparators at different predetermined voltages. If the signal from integrator 32 indicates that there is a 50% duty cycle signal, then the output on line 45 is high. This high level is delayed by delay circuit 46 and is coupled to the data input of flip-flop 48. Flip-flop 48 is only activated when the data input is high and when both comparators 40 and 41 have a comparison. If either of the comparators 40 and 41 have no comparison because the desired 4.5 volt level has shifted due to the presence of a noise signal, then capacitor 49 discharges rapidly, the output line 45 reverts toward ground and flip-flop 48 no longer passes any clock pulses on its clock input. When the data input to the flip-flop 48 is high, this flip-flop is set upon the receipt of a clock pulse from inverter gate 30.

The flip-flop 48 and its companion flip-flop 50 define together a one-shot circuit which is of conventional design and provides an output pulse at both outputs of the flip-flop 48. The width of the pulses is a function of the timing network including capacitor 51 and resistor 52. FIG. 6 shows the output from the flip-flop 48. This output pulse width may typically be 15-18 microseconds.

FIG. 2 shows the pulses on the diagram from the flip-flop 48. The pulse from the negation output couples by way of an inverter 54 to both a voltage controlled oscillator 56 and a tachometer 58.

The assertion output from the flip-flop 48 couples by way of a calibration potentiometer 59 to an integrator circuit 60 which comprises integrator device 61 which is a Motorola device MC3301, and integrator capacitor 62. A transistor 64 is also provided at the output of integrator 61 to provide additional drive, and the output at the emitter of transistor 64 is a voltage level representative of the frequency of the signal from flip-flop 48. This integrated level is coupled to the gain control input 66 of the voltage controlled oscillator device 67. Device 67 which comprises the entire voltage controlled oscillator 56 is an RCA circuit CA3094 which RCA teaches may be constructed as a voltage controlled oscillator with the frequency of operation being controlled by the input level on gain control input line 66. Regarding the calibration of the operation of the voltage controlled oscillator 56, capacitor 68 may be grounded where it connects to inverter 54 and a signal of predetermined frequency is coupled to potentiometer 59. The output of the voltage controlled oscillator is then monitored and may be varied by adjusting potentiometer 59 until the oscillator oscillates at a frequency about 15% less than the input frequency coupled to potentiometer 59. The frequency is adjusted to a value less than the input frequency so that if input synchronization pulses, coupled by way of capacitor 68, are lost the natural frequency of oscillator of the voltage controlled oscillator will only replace the single pulse and there will not be multiple replacement of pulses which could occur if the oscillator is adjusted to oscillate at a frequency higher than the frequency coupled to calibration potentiometer 59.

FIG. 6 shows this type of operation wherein the input to potentiometer 59 has a missing pulse as identified by the pulse in dotted. It is noted that the output from the voltage controlled oscillator generates a pulse a predetermined time thereafter which is the replaced pulse. As long as synchronization pulses are received by capacitor 68, the voltage controlled oscillator is controlled in accordance with these pulses. However, when a pulse is missing the natural desired operating frequency of the voltage control oscillator dominates and essentially replaces the missing pulse as depicted in the wave form in FIG. 6.

As previously mentioned, the output from inverter gate 54 also couples to tachometer 58 which includes a Motorola device integrator device 70 and associated integrator capacitor 72. Thus, the output from integrator device 70 is a voltage level which increases positively with increases in detected velocity. The output from the integrator device 70 couples to a conventional comparator 74 which has its positive input biased at approximately +2 volts by means of the voltage divider network 75. The cross-over voltage for the comparator is at a voltage corresponding to a speed of approximately 15-20 miles per hour. If the vehicle is traveling at a speed greater than 15 miles per hour, there is no comparison by comparator 74 and the output from the comparator is at or near ground of a 0 logic level. Alternatively, when the vehicle speed decreases to below 15 miles per hour the output from comparator 74 is at its high or logic 1 level. The output from comparator 74 couples by way of an inverter 76 to one NOR gate 78 and couples directly to a second NOR gate 80. The circuitry, including devices 70, 74 and 76, is for determining which of the gates 78 or 80 will pass the pulse signals. Above 15 miles per hour the gate 80 passes the signals and below 15 miles per hour the gate 78 passes the signals. The gate 80 passes signals from the voltage controlled oscillator by way of diode 81, which comprises a part of an output OR circuit, to the output line 82. Alternatively, gate 78 passes signals directly from the flip-flop 48. These signals are passed by way of diode 83.

The output from oscillator 56 could be used at low speeds below 15 miles per hour except that the device is not responsive over a wide enough frequency range. Thus, the circuitry including devices 70, 74 and 76 is added to permit the direct passage of pulses by way of gate 78 in the event that the frequency of operation is too low which in the disclosed embodiment is at a frequency corresponding to a speed of say 15 miles per hour.

Thus, on line 82 shown in FIG. 2, there are pulses that are coupled either from gate 78 or from gate 80 depending upon the output frequency from flip-flop 48. As long as the pulses are coupled from the output of gate 80, lost pulses are replaced by the operation of the voltage controlled oscillator 56. It appears that the loss of pulses is more apt to occur at the higher frequencies and thus there is not any appreciable inaccuracy by directly passing the lower frequency pulses.

The frequency of the pulses on output line 82, as previously mentioned, is a function of the speed of the vehicle. Furthermore, the frequency can be related to a particular mile per hour value as a function of certain predetermined parameters including the frequency of operation of the oscillator 14 and the angle a of tilt of the antenna 12 (see FIG. 1).

If the antenna were directed in a horizontal plane, it can be shown that a frequency of 31.4 hertz corresponds to one mile per hour. See U.S. Pat. No. 3,778,826. When the antenna is tilted at a 45° angle, then the frequency is decreased to a value of approximately 22.2 hertz per mile per hour, or to state this alternatively, approximately 800 pulses are created for every 1/100 of a mile. Therefore, regarding the odometer section of this speedometer, this section essentially counts every 800 pulses and increments the odometer by 1/100 of a mile for every 800 pulses.

Figure 3:
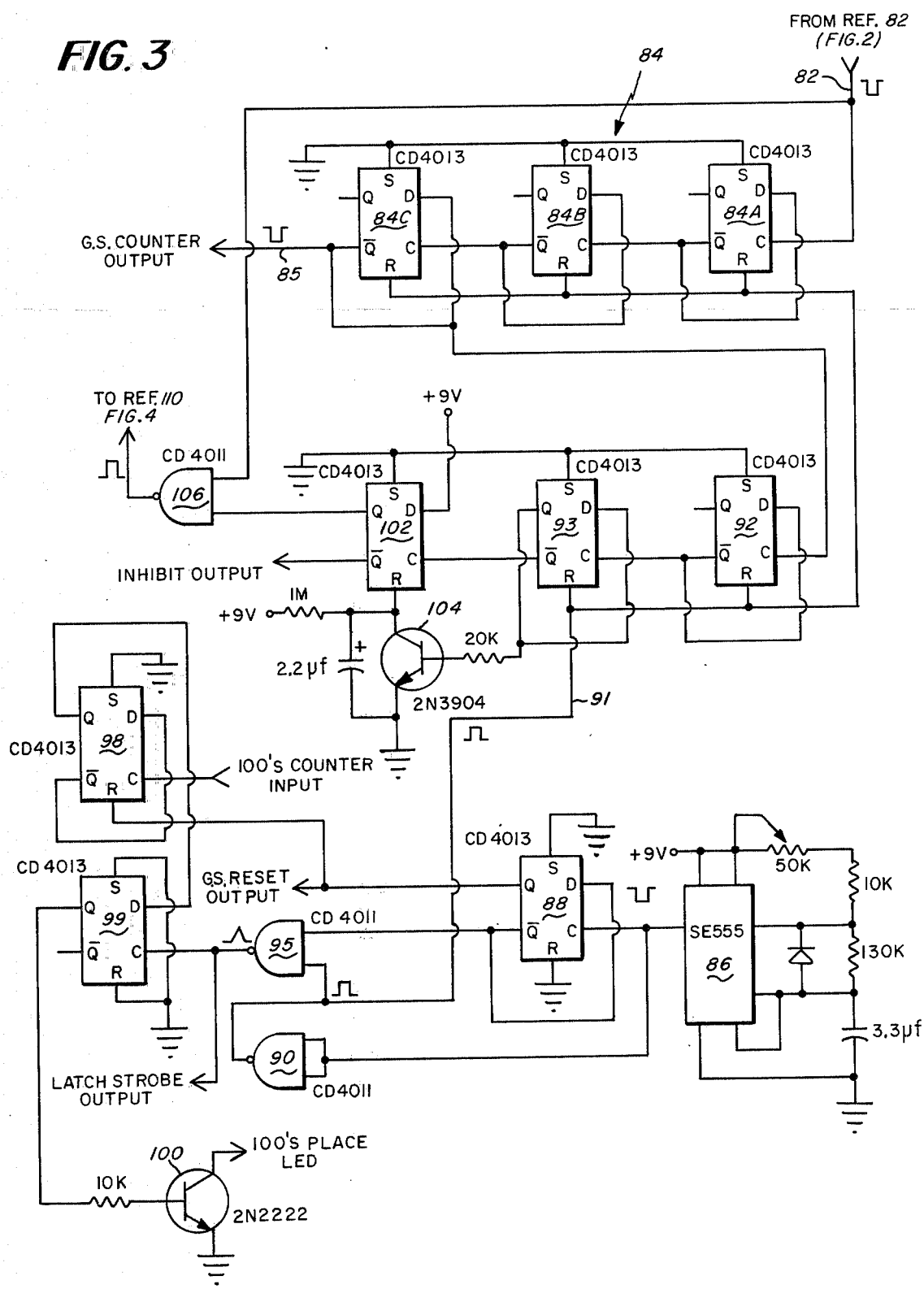
FIG. 3 is a circuit block diagram showing an intermediate counter and the main clock.
Figure 5:
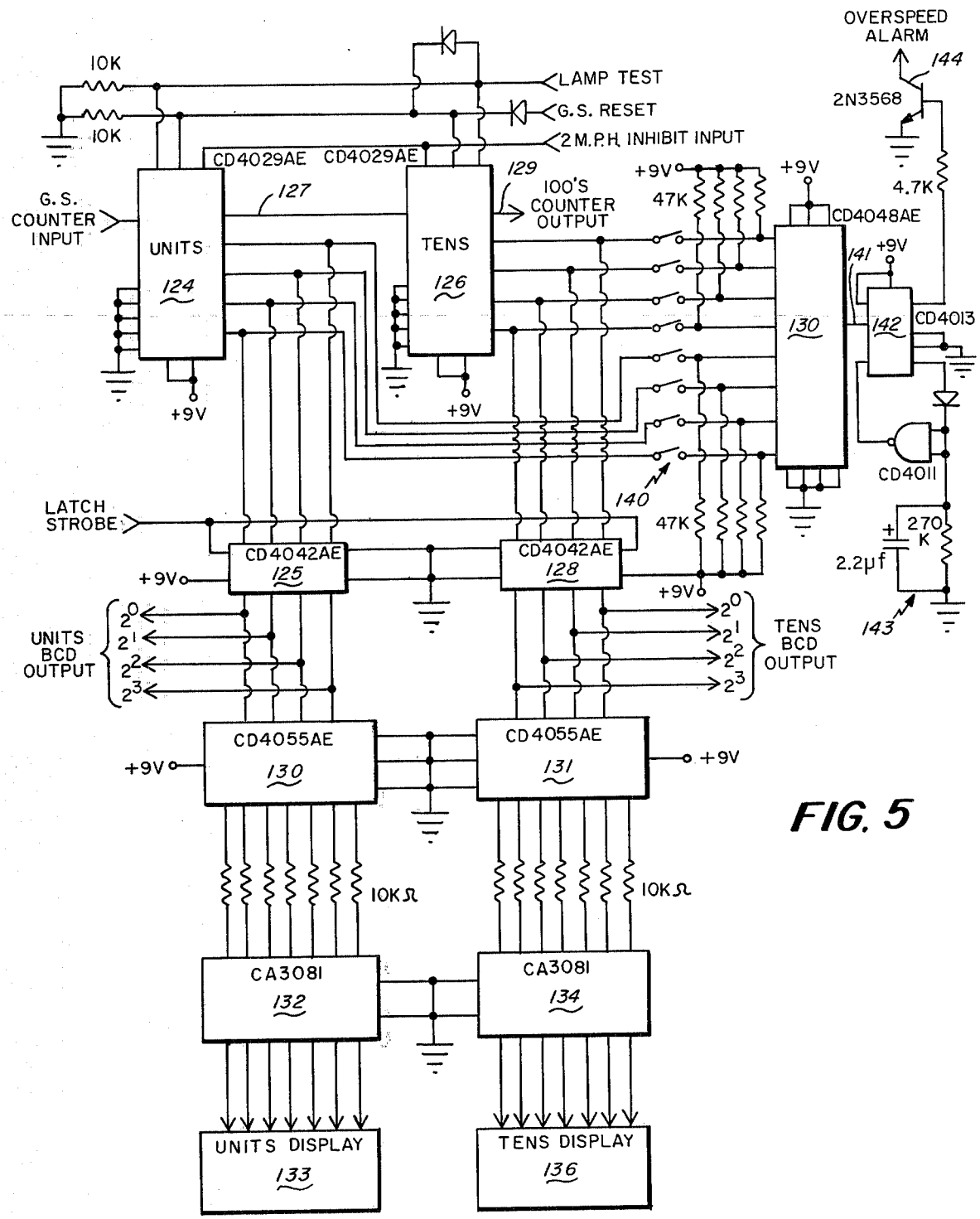
FIG. 5 is a circuit block diagram of the output speedometer circuitry.

Regarding the speedometer section shown in FIG. 5, and for the frequency of oscillation previously mentioned with reference to oscillator 14, it is known that a frequency of 2.22 kilohertz corresponds to a speed of 100 miles per hour. Because the three stage counter 84 shown in FIG. 3 provides a divide by eight count on its output line 85, this means that there are 277.5 pulses per second corresponding to a speed of 100 miles per hour on this output line 85. This means that if we permit the speedometer section to count for a time interval of 360 miliseconds. This corresponds to a possible top speed of 100 miles per hour. Thus, if we essentially form a 360 milisecond window, we can count the pulses and determine the operating speed.

Referring now to FIG. 3, as previously mentioned there is shown binary counter 84 which comprises three conventional flip-flops 84A, 84B, and 84C. The output from flip-flop 84C is a binary signal at a rate ⅛ in frequency of the input signal to flip-flop 84A. This output on line 85 couples to the circuitry shown in FIG. 5 and is discussed in more detail hereinafter.

FIG. 3 also shows an adjustable timer or main clock 86 which is of conventional design and has an output as shown in FIG. 6 every 360 miliseconds. This output is coupled to a flip-flop 88, the output of which is also shown in FIG. 6. The output from the clock 86 also couples to inverter 90. The output from inverter 90 is shown in FIG. 6 and provides a reset by way of line 91 for counter 84 and flip-flop 92 and 93, discussed hereinafter. The assertion output from flip-flop 88 is a ground speed reset output which is coupled to the circuitry shown in FIG. 5. This output essentially establishes the 360 milisecond window. The negation output from flip-flop 88 couples to a NAND gate 95 which also receives the output signal from gate 90. FIG. 6 also shows this output from gate 95. The latch strobe output from gate 95 is at a repetition rate of 720 miliseconds.

FIG. 3 also shows flip-flops 98 and 99 which are intercoupled. Flip-flop 98 receives the signal from the circuitry of FIG. 5 if a 100 count has been reached indicating that the vehicle speed is 100 miles per hour or greater. If this occurs during the window period then flip-flop 98 is set and when the latch strobe output from gate 95 goes high, the other flip-flop 99 is also set causing transistor 100 to conduct. The output from transistor 100 connects to an indicator LED for indicating this condition. If there is no 100 count then flip-flop 99 will not become set by the latch strobe pulse from gate 95.

As previously mentioned, there are two additional flip-flops 92 and 93 which couple in succession from the binary counter 84. Thus, these two additional flip-flops provide further dividing of the signal on line 85. This circuitry, including the additional flip-flop 102 and reset transistor 104, is provided to establish a minimum mile per hour inhibit signal at the negation output of flip-flop 102. Thus, when the counter 84 including the two flip-flops 92 and 93 are counting and flip-flop 93 is still reset, transistor 104 is off. When flip-flop 93 comes set transistor 104 holds flip-flop 102 reset with the negation output from flip-flop 102 at its high or inhibiting level. This output is coupled to the circuitry of FIG. 5 and is discussed in more detail hereinafter. When the flip-flop 93 again becomes set, flip-flop 102 is now permitted to set and the negation output from flip-flop 102 goes to its low state or its enabling state. This counting sequence is designed so that if the vehicle is traveling less than say 2 miles per hour, flip-flop 102 will never set and thus the negation output of flip-flop 102 is continously held in its inhibiting state. Similarly, the assertion output from flip-flop 102 when the flip-flop 102 never becomes set, inhibits operation of NAND gate 106 and prevents the passage of any pulses from line 82 by way of the gate 106.

When the vehicle is traveling at speeds greater than this 2 mile per hour speed, then flip-flop 102 will remain set and both outputs from the flip-flop 102 will be in their enabling states, respectively.

The 2 mile per hour inhibit feature is particularly useful for use with trains wherein many times the train is moved back and forth at speeds below 2 miles per hour for the purpose, for example, of coupling or uncoupling freight cars from the train.

Figure 4:
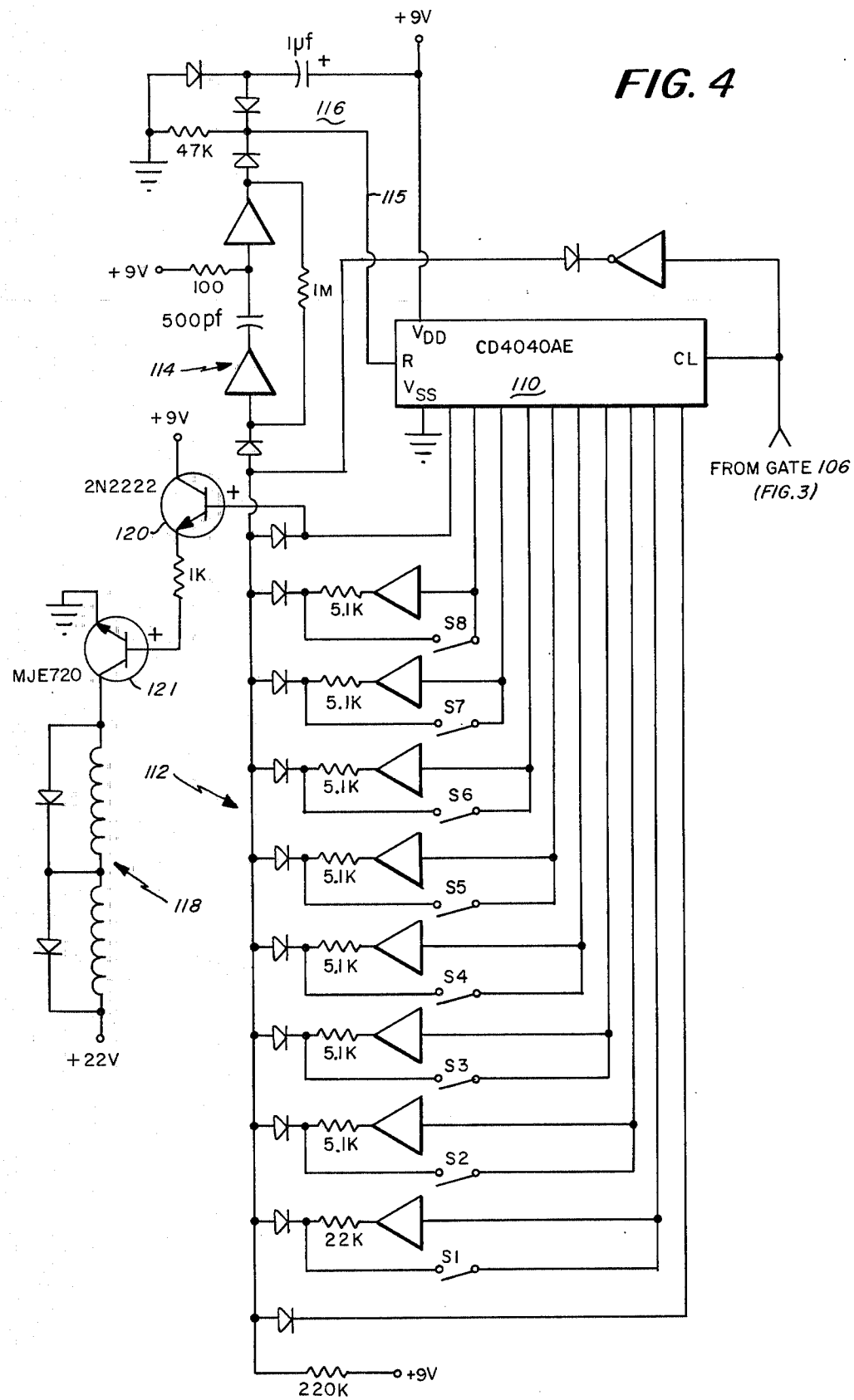
FIG. 4 is a circuit block diagram of the output odometer circuitry.

FIG. 4 shows the output odometer circuitry which comprises binary counter 110, AND circuit 112, reset circuit 114, a power-up reset circuit 116 and a display counter 118. The counter 110 receives pulses from gate 106 shown in FIG. 3 and increases its count for each pulse received. The output from counter 110 is a series of binary levels corresponding to the number of pulses received. Most of the output lines from counter 110 couple to a switch array comprising switches S1-S8. Each of these switches couple across a series connection of a resistor and inverter to one side of a diode which comprises one of a series of diodes comprising the AND gate circuit 112. At the proper binary output from counter 110 as determined by the selection by switches S1-S8, all the inputs to the AND gate 112 are true. When there is a pulse output from gate 106, a reset is provided via reset circuit 114 and line 115 to the counter 110. Regardless of the position of the switches S1-S8, when the counter 110 reaches a count of 512, transistors 120 and 121 are conductive and a counter increment pulse is coupled to the counter 118 for registering an increase in count of 1/100 of a mile.

As previously mentioned, there are approximately 800 pulses that occur for every 1/100 of a mile and thus under ideal conditions one should be able to just select the proper output to decide from counter 110 representing a count of 800 at which time the counter is reset, even though the incrementing count to counter 118 occurs at a count of 512. This 800 count can be provided by closing switches S8 and S5. With these switches closed at a count of 800 all of the diodes comprising the gate 112 are back biased and a reset occurs by way of circuit 114. With the use of the entire switch array, including switches S1-S8, it can be seen that it is possible to cause a reset at different counts other than 800 but about the 800 count. Thus, if it is found that the antenna 12 is not disposed at the desired 45° angle, but is instead disposed at say a 46° or 47° angle, it would be desirable to either increase or decrease the reset count depending upon whether the angle is greater or less than 45°. This is easily provided by the proper selection of switches S1-S8. The person installing this speedometer may even be provided with a chart that would simply correlate the angle a with the switch position of switches S1-S8.

Referring now to FIG. 5, there is shown the output speedometer circuitry which comprises a unit counter 124, a tens counter 126 and an overspeed gate 130. The counters 124 and 126 are both devices made by RCA and identified as their devices CD4029AE. The counter 124 receives its count input from the circuitry shown in FIG. 3 at the output of the divide by 8 counter 84 on output line 85. The output from counter 124 is in binary coded decimal and this output couples to a latch circuit 125. There is also a carry output from counter 124 on line 127 which couples to the clock input of the tens counter 126. Thus, counter 126 is incremented each time counter 124 completes a ten count. The output from counter 126 is also in binary coded decimal and couples to another latch circuit 128. Both of the latch circuits 125 and 128 are conventional devices sold by RCA and identified by their number CD4042AE.

The counters 124 and 126, as shown, in FIG. 5, have an input from flip-flop 102 shown in FIG. 3 which inhibits these counters until the vehicle is traveling at a speed greater than the minimum predetermined speed of 2 miles per hour. After that speed is reached, this input to the counters goes to its low level and the counters are permitted to count. The other input to both of the counters is a counter reset input which is coupled from flip-flop 88 of FIG. 3. This output is also shown in FIG. 6 and permits counting during one portion of the cycle shown in FIG. 6 but prohibits counting during the other portion of the cycle. With reference to FIG. 6, it is also noted that the latch pulse occurs at the end of one half of the cycle where the counting has taken place. In FIG. 5, the latch strobe input is shown as coupling to latches 125 and 128. Thus, after the counters 124 and 126 have counted during the counting window, the latch strobe stores the end count until the next update is to take place in another 720 miliseconds. The binary coded decimal output from the latches 125 and 128 couple to converters 130 and 131, respectively. These converters are conventional devices for converting the binary coded decimal signal to a seven segment output signal for controlling the displays by way of the driver circuits. In FIG. 5 the converter 130 couples by way of drivers 132 to the units display 133. Similarly, the converter 131 couples by way of drivers 134 to the tens display 136.

As previously mentioned, if during a counting window the tens counter should indicate a count of 100 corresponding to a speed of 100 miles per hour then there is an output on line 129 from counter 126 which is coupled to flip-flop 98 shown in FIG. 3 for causing a visual indication thereof at the output of the transistor 100, also shown in FIG. 3.

FIG. 5 also shows the overspeed AND gate 130 which in this embodiment is an RCA circuit CD4048AE. The outputs from the counters 124 and 126 are coupled by way of a switch array 140 to this gate 130. With the switch array 140 different predetermined speeds can be selected for detection by gate 130. For example, the switches of array 140 may be closed in a predetermined manner to provide an output on line 141 from gate 130 when the speed reaches 80 miles per hour. When that occurs the flip-flop 142 is set for a predetermined time period as determined by the timing circuit 143. This action causes transistor 144 to conduct and its output may couple to an overspeed alarm for warning of this condition.

Having thus described the invention, what I claim and desire to secure by Letters Patent is:

1. An electronic radar speedometer for measuring the speed of a vehicle comprising;
   means including antenna means for providing a cyclic signal the frequency of which relates to the velocity of the vehicle relative to ground,
   means responsive to said cyclic signal for sensing the duty cycle of said signal and for passing said cyclic signal substantially only when said signal has a duty cycle which lies within a predetermined range from a first preselected duty cycle to a second preselected duty cycle, said range being substantially centered about a 50% duty cycle, means responsive to said passed cyclic signal for counting the cycles thereof, and means responsive to said counting means for providing a reading corresponding to vehicle speed.

2. An electronic radar speedometer as set forth in claim 1 wherein said means for sensing and passing includes means for integrating the cyclic signal to a corresponding level and means responsive to the level of said integrated signal for providing a first control signal when said level is in a predetermined range of levels and for providing a second control signal when said level is outside said predetermined range, and means for passing said cyclic signal in response to said first control signal and for blocking said cyclic signal in response to said second control signal.

3. An electronic radar speedometer as set forth in claim 2 wherein said means responsive to the level of said integrated signal includes a pair of comparators which provide either said first or said second control signal depending on said level and a bistable device which passes said cyclic signal when said comparators provide said first control signal.

4. An electronic radar speedometer as set forth in claim 1 comprising means responsive to the frequency of said counted pulse signals for inhibiting said reading at frequencies below a predetermined frequency.

5. An electronic radar speedometer as set forth in claim 1 wherein said predetermined range extends from about a 40% duty cycle to about a 60% duty cycle.

6. An electronic radar speedometer for measuring the speed of a vehicle in accordance with claim 1 and further including means responsive to a predetermined count of said counting means for registering a cumulative count representative of distance traveled, means responsive to the count in said counting means for resetting said counting means at a preselected count thereof; and means for changing said preselected count.

7. An electronic radar speedometer as set forth in claim 6 wherein said antenna means is mounted on said vehicle and is fixed at a predetermined angle to the ground and wherein said means for changing said preselected count includes a switch array and a gate, the switches of said array being arranged to change said preselected count as a function of said predetermined angle.

8. An electronic radar speedometer for measuring the speed of a vehicle comprising:

means including antenna means for providing a cyclic signal the frequency of which relates to the velocity of the vehicle, means receiving said cyclic signal for providing a control signal that relates to the frequency of the cyclic signal, said cyclic signal providing means further including means for providing a cyclic pulse signal of pedetermined pulse width whereby said control signal varies as a function of the duty cycle of said cyclic pulse signal which is in turn a function of the frequency of the cyclic signal, controlled oscillator means receiving said cyclic signal and said control signal and having an output signal occasioned by said cyclic signal and, in the absence of said cyclic signal, by the natural oscillator output as controlled by said control signal so that the absent cyclic signal is essentially replaced by a signal under control of the control signal, and means responsive to said output signal for providing a reading corresponding to vehicle speed.

9. An electronic radar speedometer as set forth in claim 8, wherein said means for providing a control signal includes integration means for providing a control voltage level.

10. An electronic radar speedometer as set forth in claim 9 including means for coupling said cyclic pulse signal to a synchronization input of the controlled oscillator means and means for coupling said control voltage level to a control voltage input of the controlled oscillator means.

11. An electronic radar speedometer as set forth in claim 8 including means responsive to the frequency of said cyclic signal for passing said cyclic signal at frequencies below a predetermined frequency and passing the output signal from said controlled oscillator means at frequencies above said predetermined frequency.

12. An electronic radar speedometer as set forth in claim 11 wherein said means for passing includes integrator means for receiving said cyclic signal and gating means including a first gate for passing only signals from said controlled oscillator means and a second gate for passing only said cyclic signal.

13. An electronic radar speedometer as set forth in claim 8 including calibration means associated with said controlled oscillator means for controlling said oscillator at its control input to operate at a frequency less than the cyclic frequency.

14. An electronic radar speedometer as set forth in claim 13 wherein said means for providing a control signal includes means for providing a control voltage level so that said controlled oscillator operates at a natural frequency less than the cyclic frequency.

* * * * *